United States Patent
LaBaere et al.

(10) Patent No.: US 11,383,787 B2
(45) Date of Patent: Jul. 12, 2022

(54) MULTI-AXIS PIVOTING COUPLER JOINTS AND DRIVETRAIN ARCHITECTURES FOR INTELLIGENT ELECTRIC SCOOTERS

(71) Applicant: GM Global Technology Operations LLC, Detroit, MI (US)

(72) Inventors: Bradly LaBaere, Washington Township, MI (US); Carlos E. Caro Suarez, Warren, MI (US); Brian V. Castillo, Birmingham, MI (US); Sandra N Thomson, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 960 days.

(21) Appl. No.: 16/142,428

(22) Filed: Sep. 26, 2018

(65) Prior Publication Data

US 2020/0094904 A1 Mar. 26, 2020

(51) Int. Cl.
*B62K 7/04* (2006.01)
*B62K 5/05* (2013.01)
(Continued)

(52) U.S. Cl.
CPC .................. *B62K 7/04* (2013.01); *B62K 5/05* (2013.01); *B62K 5/06* (2013.01); *F16C 11/04* (2013.01);
(Continued)

(58) Field of Classification Search
CPC ... B62K 7/04; B62K 5/05; B62K 5/06; B62K 2202/00; B62K 2204/00; B62K 3/002;
(Continued)

(56) References Cited

U.S. PATENT DOCUMENTS

| | | |
|---|---|---|
| 2,482,585 A | 9/1949 | Hauptman |
| 3,921,741 A | 11/1975 | Garfinkle et al. |

(Continued)

FOREIGN PATENT DOCUMENTS

| | | |
|---|---|---|
| BE | 1013785 A6 | 8/2002 |
| CN | 101808885 A | 8/2010 |

(Continued)

OTHER PUBLICATIONS

Motorized Scooter Background Information, Sep. 2018, USA.

*Primary Examiner* — Darlene P Condra
(74) *Attorney, Agent, or Firm* — Quinn IP Law (57) ABSTRACT

Presented are multi-axis pivoting coupler joints for motorized vehicles, methods for making/using such coupler joints, and electric scooters with multi-axis pivoting coupler joints enabling multimodal scooter operation. A pivoting coupler joint includes first and second bearing assemblies each with a respective housing, respective inner and outer races concentric with each other and located in their respective housing, and a respective set of rolling elements rollably interposed between their respective inner and outer races. The first inner race of the first bearing assembly receives therethrough and circumscribes an axle shaft of a vehicle wheel. The second inner race attaches to a wheeled rider deck of the vehicle. The first and second bearing housings are joined together and angularly offset from each other. For some applications, the first bearing assembly includes a pair of longitudinally spaced needle roller bearings, and the second bearing assembly includes a pair of longitudinally spaced tapered bearings.

20 Claims, 5 Drawing Sheets

(51) Int. Cl.
  *B62K 5/06* (2006.01)
  *F16C 11/04* (2006.01)
  *F16C 33/36* (2006.01)

(52) U.S. Cl.
  CPC ........ *B62K 2202/00* (2013.01); *F16C 33/366* (2013.01); *F16C 2326/26* (2013.01)

(58) Field of Classification Search
  CPC .......... B62K 5/01; F16C 11/04; F16C 33/366; F16C 2326/26; F16C 19/543; F16C 19/545
  See application file for complete search history.

(56) References Cited

U.S. PATENT DOCUMENTS

| | | | |
|---|---|---|---|
| 5,243,873 A * | 9/1993 | Demers | B25J 17/0275 901/29 |
| 5,878,831 A | 3/1999 | Saito et al. | |
| 6,367,833 B1 | 4/2002 | Horiuchi | |
| 6,580,188 B2 | 6/2003 | Katagiri et al. | |
| 6,629,574 B2 | 10/2003 | Turner | |
| 8,183,726 B2 | 5/2012 | Rittenhouse | |
| D735,812 S | 8/2015 | Delgatty | |
| 9,108,700 B2 | 8/2015 | Chen et al. | |
| 9,168,965 B2 | 10/2015 | Lovley, II et al. | |
| 9,771,124 B2 | 9/2017 | Seagraves et al. | |
| 9,840,305 B1 | 12/2017 | Tsuchizawa et al. | |
| 9,857,252 B2 | 1/2018 | Murugesan et al. | |
| 2007/0107963 A1 | 5/2007 | Chiu | |
| 2008/0177433 A1 | 7/2008 | Teo et al. | |
| 2008/0217085 A1 | 9/2008 | Wernli | |
| 2009/0102408 A1 | 4/2009 | De Jesus et al. | |
| 2011/0024217 A1 | 2/2011 | Sluijter et al. | |
| 2011/0160945 A1 | 6/2011 | Gale | |
| 2011/0215548 A1 | 9/2011 | Horwat, Jr. | |
| 2012/0202649 A1 | 8/2012 | Huber | |
| 2013/0179016 A1 | 7/2013 | Gale | |
| 2014/0008138 A1 | 1/2014 | Kim et al. | |
| 2014/0251056 A1 * | 9/2014 | Preuss | B25J 9/042 29/428 |
| 2016/0194051 A1 * | 7/2016 | Seidl | F16C 11/06 280/283 |
| 2016/0304157 A1 | 10/2016 | Craven et al. | |
| 2018/0281838 A1 | 10/2018 | Andersson | |
| 2020/0271158 A1* | 8/2020 | Bennett | F16C 19/502 |

FOREIGN PATENT DOCUMENTS

| | | | |
|---|---|---|---|
| CN | 201747775 U | 2/2011 | |
| CN | 103477101 A | 12/2013 | |
| CN | 204507138 U * | 7/2015 | |
| CN | 204507138 U | 7/2015 | |
| DE | 19633692 A1 * | 2/1998 | B62K 25/24 |
| DE | 102006049770 A1 | 5/2008 | |

\* cited by examiner

MULTI-AXIS PIVOTING COUPLER JOINTS AND DRIVETRAIN ARCHITECTURES FOR INTELLIGENT ELECTRIC SCOOTERS

INTRODUCTION

The present disclosure relates generally to motor-assisted, manually powered vehicles. More specifically, aspects of this disclosure relate to propulsion assist systems and drivetrain architectures for stand-up type electric scooters.

Many vehicles that have traditionally been powered by the vehicle's operator—be it hand-powered or foot-powered designs—may now be originally equipped with or retrofit to include a traction motor for assisting with propelling the vehicle. The traction motor, which may take on the form of an internal combustion engine (ICE) or an electric motor, generally propels the vehicle in either an assisted or an unassisted capacity, i.e., with or without manually generated motive power. For instance, a stand-up type electric scooter (colloquially referred to as an "electric kick scooter" or "E-scooter") is equipped with an on-board electric motor for providing supplemental tractive torque that assists or "boosts" a rider's foot-generated tractive force. The traction motor operates alone or in conjunction with a power transmission to rotate a driven member of the E-scooter, such as a wheel hub or axle shaft. Output torque from the motor may be selectively delivered to the driven member, e.g., when the rider negotiates a road surface with a pronounced gradient along a travel route. In this manner, the rider's perceived manual effort needed to propel the vehicle may be reduced when riding an E-scooter relative to the perceived effort on a standard scooter lacking an electrical assist (e-assist) function

SUMMARY

Disclosed herein are multi-axis pivoting coupler joints and drivetrain architectures for motor-assisted, human-powered vehicles, methods for using and methods for constructing such pivoting coupler joints, and intelligent electric scooters with multi-axis pivoting coupler joints enabling multimodal scooter operation. By way of example, there are presented novel intelligent electric scooter architectures that employ an electric traction motor and an onboard traction battery pack for transporting users and cargo. Using a mid-mount, transverse motor layout, the electric traction motor is connected via a power-split differential to the axle shafts of two of the scooter's ground wheels. Force sensors placed in the scooter deck and handlebars are used to regulate motor output. A multi-axis pivoting coupler joint connects a wheeled scooter deck to the scooter's main chassis. This pivoting coupler joint is fabricated with a roller bearing assembly that is orthogonally aligned with and welded to a tapered bearing assembly. The roller bearing assembly receives therethrough and coaxially rotates with one of the axle shafts, whereas the tapered bearing assembly rotatably mounts thereon the rider platform. Once operatively connected, the pivoting coupler joint enables the rider platform to rotate around a vertical (z) axis (i.e., "yaw") and independently rotate around a transverse (y) axis (i.e., "pitch").

Attendant benefits for at least some of the disclosed concepts include enabling a rider platform to carry a dynamic load without imposing a net moment to the vehicle's chassis about the axle shafts. In addition, disclosed pivoting coupler joints enable a vehicle to accommodate large differentials in mass distribution between leading and trailing sections of the vehicle without either section imposing unresolved moments upon the other. Another attendant benefit may include helping to resolve pushing/pulling forces on the rider platform at the axle shaft centerline such that no net moment is imposed around the axle. The joint also enables the axle shafts to be driven by a single motor with the use of a differential, rather than requiring individually driven wheels or constant-velocity (CV) jointed half-shafts. Disclosed intelligent electric scooters offer an electrified alternative to conventional push carts and stand-up kick scooters of this form factor, and provide multi-modal operation and tight turn angles for effective maneuvering. Disclosed architectures may serve as a base platform for numerous electrified mobility solutions, such as electric kick scooters, cargo carts, strollers, wheelchairs, shopping carts, golf caddies, etc. In addition to providing cross-platform flexibility, these electric scooter architectures are readily scalable to accommodate different sized payloads and distinct work environments.

Aspects of this disclosure are directed to multi-axis articulating joints for connecting wheeled rider platforms to chassis of motor-assisted, human-powered vehicles. For instance, a pivoting coupler joint is disclosed for connecting a wheeled rider deck to a support frame ("chassis") of a vehicle. The vehicle includes first and second wheels that are rotatably attached via one or more axle shafts to the chassis. The wheeled rider deck is configured to support thereon a user, e.g., during operation and propulsion of the vehicle. The pivoting coupler joint includes a first bearing assembly with a first bearing housing, and first inner and outer races concentric with each other and located inside the first bearing housing. A first plurality of rolling elements is rollably interposed between the first inner and outer races. The first inner race receives therethrough and circumscribes at least one or only one of the drivetrain axle shafts. The pivoting coupler joint also includes a second bearing assembly with a second bearing housing, and second inner and outer races concentric with each other and located inside the second bearing housing. A second plurality of rolling elements is rollably interposed between the second inner and outer races. The second inner race attaches to the wheeled rider deck, e.g., via a threaded mounting bolt. The first and second bearing housings are joined together, e.g., via welding, machining, or casting, and angularly offset from each other, e.g., 90 degrees. With this configuration, the wheeled rider deck may selectively rotate about a vertical axis (yaw) and a transverse axis (pitch).

Other aspects of the present disclosure are directed to motor-assisted, human-powered vehicles with adaptive propulsion assist systems. As used herein, the term "vehicle" and permutations thereof may include any relevant motorized vehicle platform that is powered predominantly by a human, such as motor-assisted scooters, carts, strollers, cycles, cargo pallets and dollies, etc. In an example, an intelligent electric scooter is presented that includes a rigid vehicle chassis and an elongated, wheeled scooter deck that projects rearwardly from the chassis and provides subjacent support for a standing user. A handlebar, e.g., with one or more handles and a corresponding number of hand brake assemblies, is mounted to the vehicle chassis and configured to be manually operated by the user. Multiple ground wheels, a traction battery pack, and a traction motor are also operatively attached to the vehicle chassis. The traction motor is electrically connected to the traction battery pack and is operable to selectively impart assist torque to drive one or more of the ground wheels. The electric scooter's powertrain may optionally include a power-split differential that connects the traction motor to a pair of axle halfshafts for driving left-hand and right-hand side wheels.

Continuing with the discussion of the above example, a pivoting coupler joint movably mounts the wheeled scooter deck to the vehicle chassis such that the scooter deck can pitch and yaw with respect to the chassis. The pivoting coupler joint is fabricated with a first bearing assembly with a respective housing, concentric inner and outer races located inside the respective bearing housing, and a respective set of rolling elements rollably interposed between the respective inner and outer races. The inner race of the first bearing assembly receives therethrough and circumscribes a first axle shaft. The pivoting coupler joint is also fabricated with a second bearing assembly with a respective housing, concentric inner and outer races located inside the respective bearing housing, and a respective set of rolling elements rollably interposed between the respective set inner and outer races. The second inner race is attached to the wheeled scooter deck. The first and second bearing housings are rigidly joined together and are orthogonal with each other.

Additional aspects of this disclosure are directed to methods for constructing and methods for operating any of the disclosed coupling joints, drivetrains, and vehicles. In an example, a method is presented for manufacturing a pivoting coupler joint for a vehicle. This representative method includes, in any order and in any combination with any of the above and below disclosed features: assembling a first bearing assembly with a first bearing housing, first inner and outer races concentric with each other and located in the first bearing housing, and a first plurality of rolling elements rollably interposed between the first inner and outer races, the first inner race being configured to receive therethrough and circumscribe the axle shaft; assembling a second bearing assembly with a second bearing housing, second inner and outer races concentric with each other and located in the second bearing housing, and a second plurality of rolling elements rollably interposed between the second inner and outer races, the second inner race being configured to attach to the wheeled rider deck; and, joining the first bearing housing to the second bearing housing such that the first and second bearing housings are angularly offset with each other.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these examples are provided as a representation of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a forward driving direction of a motor-assisted, human-powered vehicle when the vehicle is operatively oriented on a planar surface.

Figure 1:
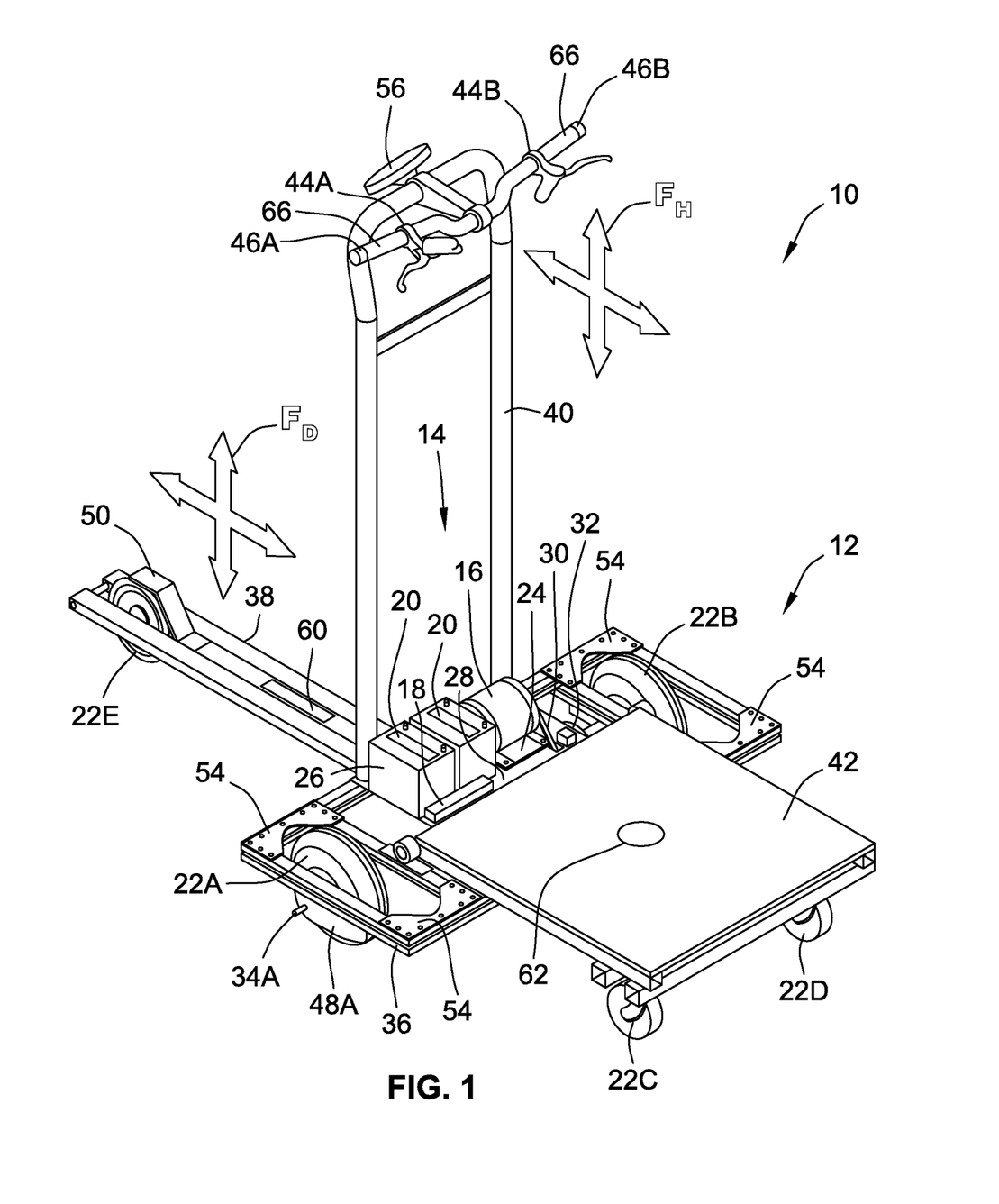
FIG. 1 is a front, perspective-view illustration of a representative motor-assisted, human-powered vehicle having adaptive propulsion assist capabilities in accordance with aspects of the present disclosure.

Referring now to the drawings, wherein like reference numbers refer to like features throughout the several views, there is shown in FIG. 1 a representative motor-assisted, human-powered vehicle, which is designated generally at 10 and portrayed herein for purposes of discussion as a stand-up type electric scooter with forward cargo bed. Distributed throughout the electric scooter 10, e.g., packaged at different locations on a vehicle chassis 12, is an adaptive propulsion assist system 14 that provides supplemental torque for propelling the electric scooter 10. The illustrated motor-assisted, human-powered vehicle 10—also referred to herein as "manually powered vehicle" or "vehicle" for brevity—is merely an exemplary application with which aspects and features of this disclosure may be practiced. In the same vein, implementation of the present concepts for the specific powertrain architecture discussed below should also be appreciated as an exemplary application of the novel features disclosed herein. As such, it will be understood that aspects and features of this disclosure may be applied to other power assist systems, and may be implemented for any logically relevant type of manually powered vehicle. Lastly, the drawings presented herein are not necessarily to scale and are provided purely for instructional purposes. Thus, the specific and relative dimensions shown in the drawings are not to be construed as limiting.

Adaptive propulsion assist system 14 of FIG. 1 is generally composed of a traction motor 16 that communicates with and, at the same time, is governed by a resident vehicle controller 18, both of which are securely mounted onto the rigid vehicle chassis 12. According to the illustrated example, the traction motor 16 is a transverse-mounted, multi-phase electric motor/generator unit (MGU) that is powered by one or more rechargeable traction battery modules 20 (collectively defining a "traction battery pack"). These traction battery modules 20 store energy that can be used to power the onboard vehicle electronics and to power the MGU 16 for selectively driving right-hand (starboard) and left-hand (port) ground wheel units 22A and 22B, respectively. For at least some applications, the traction motor 16 and battery packs 20 are affixed by a mounting bracket 24 and battery cases 26, respectively, to a mounting plate 28 of the vehicle chassis 12. An optional outer housing (removed from the Figures for ease of reference to the underlying components) may cover and protect the motor 16, battery modules 20, and any attendant peripheral hardware. Traction battery modules 20 may take on many suitable configurations, including a stack of lead-acid, lithium-ion, or lithium-polymer cells, or other applicable type of high-voltage, high ampere-hour capacity, direct current (DC) electric vehicle battery (EVB).

To impart motive power to the vehicle 10, the traction motor 16 is drivingly coupled to the two lateral wheel units 22A, 22B through a suitable power transmission, such as a belt-drive or a chain-drive transmission 30. The vehicle's final drive system employs a split-power differential gear train 32 (more commonly referred to as a "differential") that apportions motor-generated torque and power between the wheel units 22A, 22B. Each of two axle shafts 34A (FIG. 1) and 34B (FIG. 2) is operatively connected at one end thereof, e.g., via splined engagement, to the differential 32 and at the opposite end thereof, e.g., via a shaft coupler 70, to a respective one of the ground wheel units 22A, 22B. While shown as a mid-mount, transverse motor layout, the traction motor 16 may be reoriented or repositioned to other locations of the vehicle chassis 12 and drivingly connected to any or all of the ground wheels 22A-22E, e.g., to provide a front-wheel drive (FWD), rear-wheel drive (RWD), four-wheel drive (4WD), or all-wheel drive (AWD) drivetrain configuration. For instance, alternative power assist architectures may drivingly connect the traction motor 16 to the caster-type front wheel units 22C and 22D—a FWD drivetrain—or, if desired, to a non-swivel rear wheel unit 22E—a RWD drivetrain—to provide driving power for propulsion of the vehicle 10. It is further envisioned that the vehicle 10 employ other prime movers for supplemental propulsion, including an internal combustion engine (ICE) assembly or a hybrid powertrain that employs both an electric machine and a combustion engine.

With continuing reference to FIG. 1, the traction motor 16 is electrically connected to and energized by the traction battery module(s) 20 to propel the vehicle 10 in either an unassisted "motor-only" propulsion mode or an assisted "motor-rider" propulsion mode. Resident vehicle controller 18 is programmed to receive and process various user-input signals, sensor signals, and wireless data exchanges, and respond to these inputs by modulating output of the traction motor 16 via one or more motor control signals. During a motor-rider operating mode, the traction motor 16 outputs an "e-assist" torque at a level sufficient to augment or "boost" user-generated torque while still satisfying, to the extent possible, one or more desired e-assist objectives of a user. Conversely, when functioning in a motor-only operating mode, the traction motor 16 outputs a motive torque that is sufficient to temporarily propel the vehicle 10 without a kicking-gait motion from the rider to push the vehicle 10. In this manner, the resident vehicle controller 18 may automatically allocate electrical energy from the traction battery modules 20 to the traction motor 16 in real-time and, thus, reserves and optimizes e-assist functions in real-time while the vehicle 10 negotiates a travel route.

Figure 2:
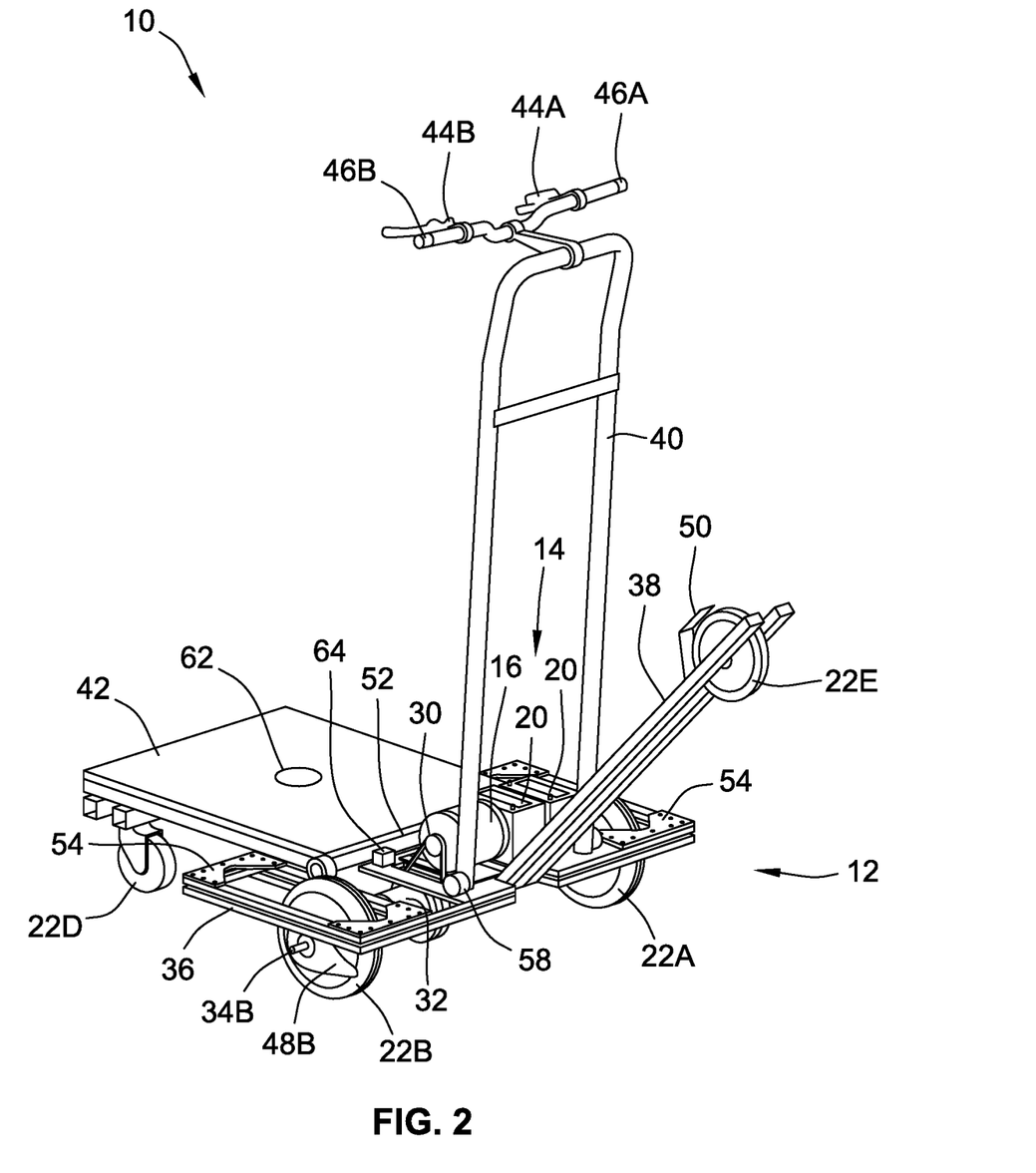
FIG. 2 is a rear, perspective-view illustration of the representative motor-assisted, human-powered vehicle of FIG. 1.
Figure 3:
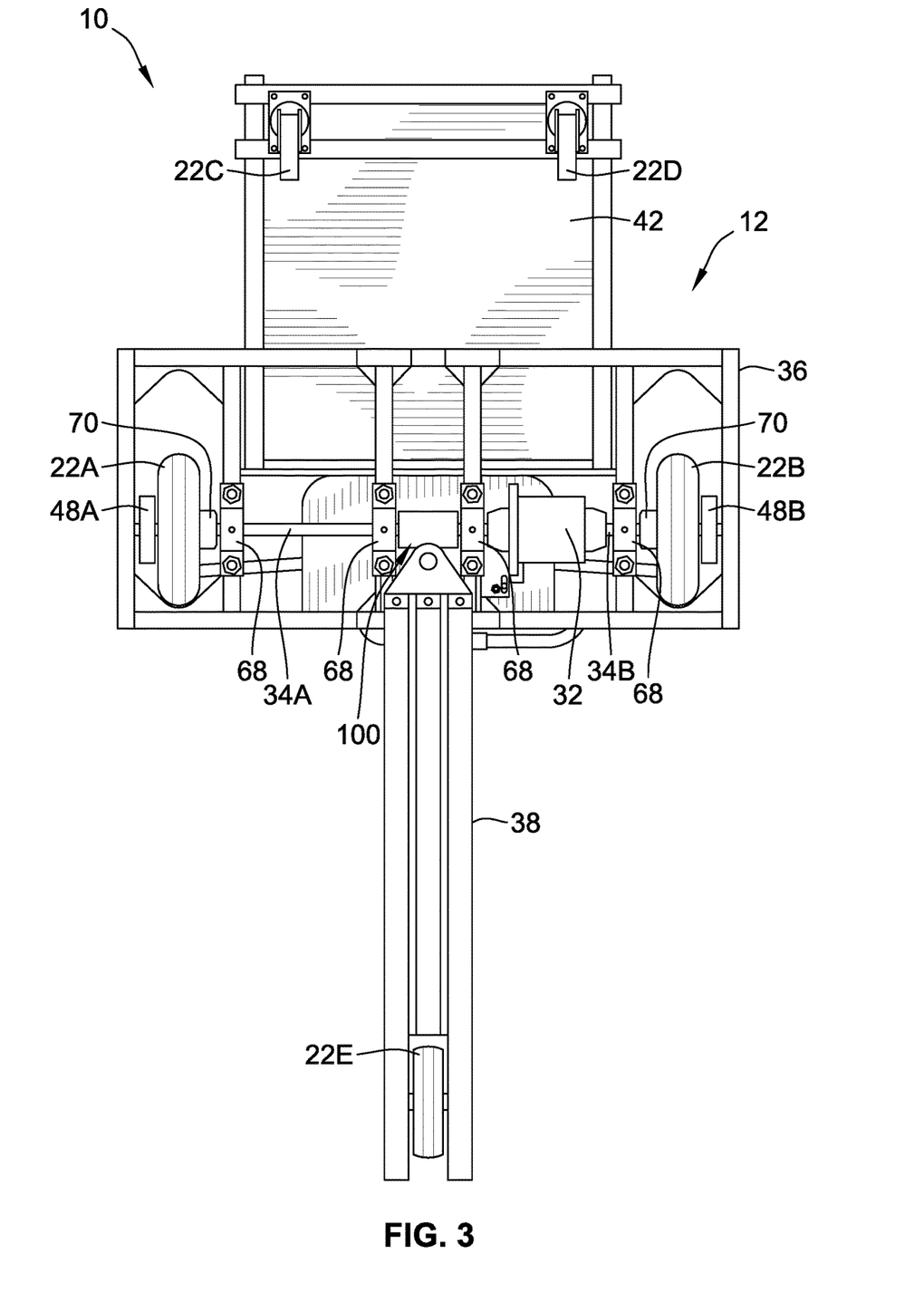
FIG. 3 bottom-view illustration of the representative motor-assisted, human-powered vehicle of FIG. 1.

Electric scooter 10 of FIG. 1 may take on a variety of different scooter, cart, and hybrid-body configurations, including trike, quadracycle, and pentacycle designs, that incorporate a cargo bed, basket, bin, or other loadbearing structure for transporting cargo. By way of non-limiting example, the representative vehicle 10 is portrayed as a five-wheel electric cargo scooter with a vehicle chassis 12 that is fabricated with a box-type support frame 36, a wheeled scooter deck 38, an upright handlebar set 40, and a forward cargo bed 42. Scooter deck 38 projects rearwardly from the box-type frame 36 for supporting thereon a standing rider (not shown). It is envisioned that the scooter deck 38 may be secured to the frame 36, e.g., via rivets, fasteners, or couplings, or may be eliminated from the vehicle 10 architecture altogether, e.g., for a cart, caddy or stroller design. In accord with the illustrated example, scooter deck 38 of FIGS. 1-3 is shown movably mounted to the frame 36 via a multi-axis pivoting coupler joint 100 (FIGS. 4-6) to transition back-and-forth between a generally horizontal "deployed" position and a generally vertical "stowed" position. As will be described in further detail below, the pivoting coupler joint 100 allows the scooter deck 38 to pivot up and down in a pitching motion, e.g., about a transverse axis, as well as forward and back in a yawing motion, e.g., about a vertical axis. Frame 36, scooter deck 38, handlebar set 40, and cargo bed 42 may each be manufactured from a rigid metallic material, such as 80/20 aluminum, a high-strength polymer, such as rigid polyvinyl chloride (RPVC), or a combination of suitably rigid, rust resistant materials.

Handlebar set 40 projects upwardly from the box-type support frame 36 and allows the rider to manually control the heading and directional changes of the vehicle 10. Right-hand and left-hand brake lever assemblies 44A and 44B, respectively, are mounted on the handlebar set 40 adjacent respective handle grips 46A and 46B. These brake lever assemblies 44A, 44B allow the user to selectively slow and stop the vehicle 10 by actuating right-side and left-side drum brake assemblies 48A (FIG. 1) and 48B (FIG. 2). An optional foot brake 50 attached in proximity to a rearward end of the wheeled scooter deck 38 is designed to be pressed down by a user's foot to frictionally engage and thereby slow the rear wheel unit 22E. Any of the foregoing braking operations may be accompanied by a controller-regulated reduction or cessation of traction motor output. Located at the front of the vehicle 10, forward cargo bed 42 provides a rigid work surface for seating thereon and supporting a cargo payload. Although not shown, the cargo bed 42 may incorporate guard rails, a basket, or a container to provide additional retention and protection while transporting payloads placed on the vehicle 10. A slide-attachment bracket 52 mechanically couples the rearward-most end of the cargo bed 42 to the frame 36 and allows for adjustable repositioning of the cargo bed 42. Optional support plates 54 may be mounted to the frame 36 fore and aft of the left-hand and right-hand side ground wheel units 22A and 22B.

For at least some applications, the vehicle 10 may be optionally equipped with regenerative charging capabilities that enable the traction battery module(s) 20 to be recharged during operation of the vehicle 10. When the vehicle 10 is on a decline, for example, the ground wheel units 22A, 22B may normally freewheel while gravity provisionally provides the motive force that propels the vehicle 10. Alternatively, the resident vehicle controller 18 may switch the traction motor 16 from a motoring mode to a generator mode thereby allowing the motor 18 to produce electrical energy, e.g., by inducing electromagnetic induction through the motor's rotor and stator. To enable such a regenerative charging embodiment of the vehicle 10, the traction motor 16 may be equipped with the requisite power conditioning equipment, e.g., a power inverter, DC-DC converter, link capacitors, and/or other power filtering components, etc. Regenerative charging may also be enabled when the vehicle 10 is being propelled by the rider.

E-assist capabilities may be selectively provided by the traction motor 16 in response to motor control signals from the resident vehicle controller 18. Real-time interface of the rider with the resident vehicle controller 18 may be facilitated via a human machine interface (HMI) (i.e., touchscreen interactive display device 56) that is mounted onto the handlebar set 40 of the vehicle 10. Vehicle controller 18 may also exchange data with a fitness tracker device, such as a wearable electronic monitoring device (not shown), that is operable to measure the heart rate, caloric expenditure, perspiration, pedal rate, or any other such health-related and activity-related parameters of the rider. As another option, the rider may use a cellular-enabled smartphone, watch, or tablet computer to provide additional inputs to the resident vehicle controller 18, such as real-time vehicle location tracking, user preferences and milestones, historical assist level data, etc. Each of the resident vehicle controller 18, wearable electronic device, and/or smartphone/tablet/watch may communicate wirelessly with one another and with one or more remote computing nodes, such as a cloud computing resource service or a backend or middleware server computing node. Communication capabilities with remote, off-board networked devices may be provided via a cellular chipset/component, a wireless modem, a navigation and location chipset/component (e.g., GPS transceiver), a short-range wireless communication device (e.g., a Bluetooth® unit or near field communications (NFC) transceiver), a dual antenna, or any suitable means of wireless communication.

As indicated above, resident vehicle controller 18 is constructed and programmed to govern, among other things, operation of the traction motor 16. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor (s)), and associated memory and storage (e.g., read only, programmable read only, random access, hard drive, tangible, etc.)), whether resident, remote or a combination of both. The vehicle controller 18 may execute one or more software or firmware programs or routines, combinational logic circuit(s), input/output circuit(s) and devices, and include appropriate signal conditioning and buffer circuitry, and other components to provide the described functionality. Software, firmware, programs, instructions, routines, code, algorithms and similar terms may mean any controller executable instruction sets including calibrations and lookup tables. The controller may be designed with a set of control routines executed to provide desired functions. Control routines are executed, such as by a central processing unit, and are operable to monitor inputs from sensing devices and other networked control modules, to execute control and diagnostic routines for controlling operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of calibrated events during operation of the vehicle 10.

The unique vehicle architecture presented in FIGS. 1-3 allows the motor-assisted, human-powered vehicle 10 to be used in at least three different motor-assisted/unassisted configurations: (1) a "walk-behind" configuration; (2) a "ride-behind" configuration; and (3) a "dual-mode" configuration. The walk-behind configuration may be typified as a cart or stroller-type arrangement where the scooter deck 38 is removed or stored such that the user's gate is unimpeded while pushing the vehicle 10. Comparatively, the ride-behind configuration may be exemplified as an e-scooter type arrangement where the rider stands on the scooter deck 38 while the vehicle 10 is propelled entirely by the traction motor 16. The dual mode configuration, by comparison, may be typified as a hybrid powertrain type arrangement that allows the user to stand on the scooter deck 38 and cooperate with the motor 16 to contemporaneously propel the vehicle 10. To this end, the illustrated vehicle architecture may serve as a platform for a multitude of electrified mobility solutions, such as a cargo scooter, electric stroller, commuter scooter, wheelchair, and any of the other options described herein.

All vehicle architecture variants may provide a rider with three power-assist operating modes: (1) a mass-compensating "load assist" mode; (2) a motion-compensating "friction assist" mode; and (3) an incline-compensating "grade assist" mode, all of which are described in further detail below. In order to supplement user-generated effort to move a heavy payload, load assist operations modulate motor output based, at least in part, on forces applied by the user to the scooter handle 40 and/or scooter deck 38. These forces may be measured by a first force sensor 58, such as rotary potentiometer or a linear variable differential transformer (LVDT), and a load sensor 62, such as a compression/shear force sensing pad. In an example, load assist increases motor output proportional to increases in user-generated force to the handlebars. Friction assist operations modulate motor output to prevent inadvertent speed reductions caused by surface friction, including variable surface friction ("mixed-mu") travel routes. By comparison, grade assist operations use control-loop feedback from a distributed array of in-vehicle sensors and accelerometers to determine surface incline/decline angle and thereby vary motor output to reduce excessive efforts and prevent unintended vehicle deceleration/acceleration on such inclines/declines. This distributed array of sensors may include any one or more or all of a first force sensor 58 operatively connected to the handlebar assembly 40, a second force sensor 60 (e.g., a polyurethane dielectric capacitive pressure sensor) operatively connected to the scooter deck 38, a load sensor 62 operatively connected to the cargo bed 42, an inertial measurement unit (IMU) 64 operatively connected to the mounting plate 28, and a pair of capacitive touch sensors 66 operatively connected to the handle grips 46A, 46B.

An optional adaptive cruise control feature governs motor output to help maintain vehicle speed at approximately the same speed as when the user is "scooting" the vehicle 10 without motor assistance. For instance, the resident vehicle controller 18 may track real-time speed of the vehicle 10 while e-assist is disabled; upon activation of e-assist, e.g., in response to a detected roadway incline, torque output of the traction motor 16 may be increased to an amount sufficient to maintain "post-assist" vehicle speed at the same "pre-assist" vehicle speed value. It is further envisioned that motor braking may be implemented to slow the vehicle 10 in instances where the adaptive cruise control wishes to reduce vehicle speed in order to continue "pre-assist" vehicle speeds.

In addition to activating the brake assemblies 48A, 48B, depression of either brake lever assembly 44A, 44B may also function to temporarily disable the motor 16. In the same vein, lack of contact between the user and vehicle 10, e.g., as sensed by the capacitive touch sensors 66 or pressure sensor 60, may likewise temporarily disable the motor 16. The foregoing features may help to allow a heavy vehicle (e.g., one with a heavy payload) to behave like a comparably lighter vehicle (e.g., one without a heavy payload). In addition, these features may help to enable vehicle control without throttle buttons or steering wheels, and may also help to promote greater vehicle control with auto stop features that prevent involuntary vehicle "runaway."

Figure 4:
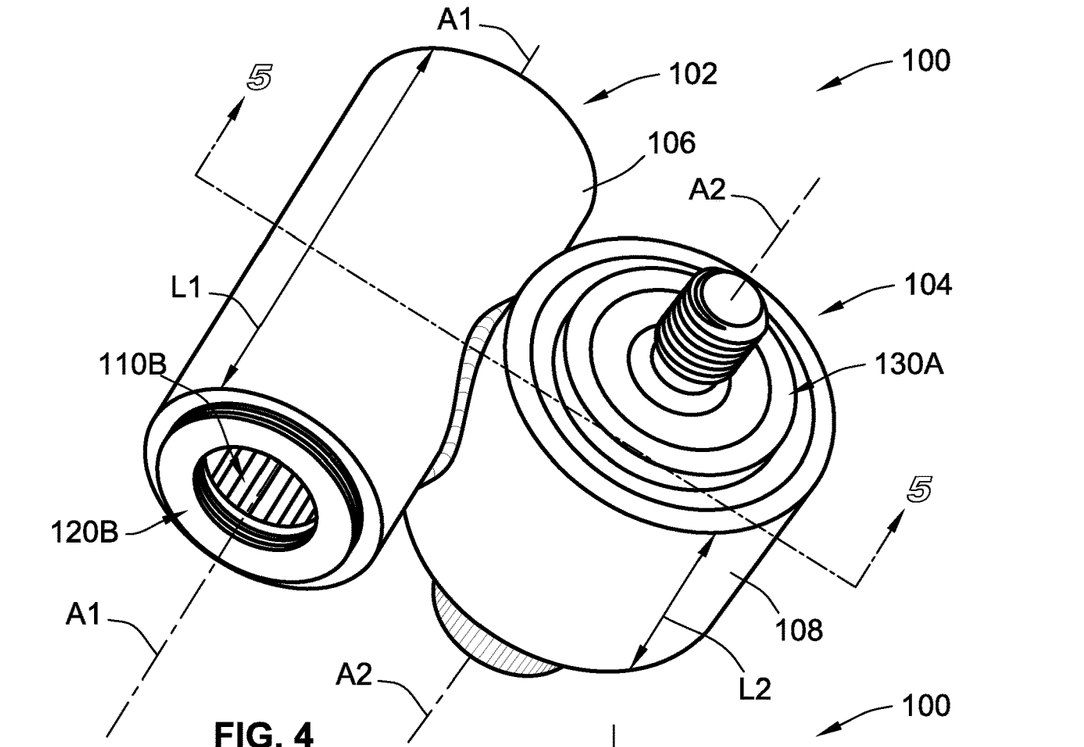
FIG. 4 is a perspective-view illustration of a representative multi-axis pivoting coupler joint for pivotably mounting a wheeled scooter deck to a chassis of a motor-assisted, human-powered vehicle in accordance with aspects of the present disclosure.
Figure 5:
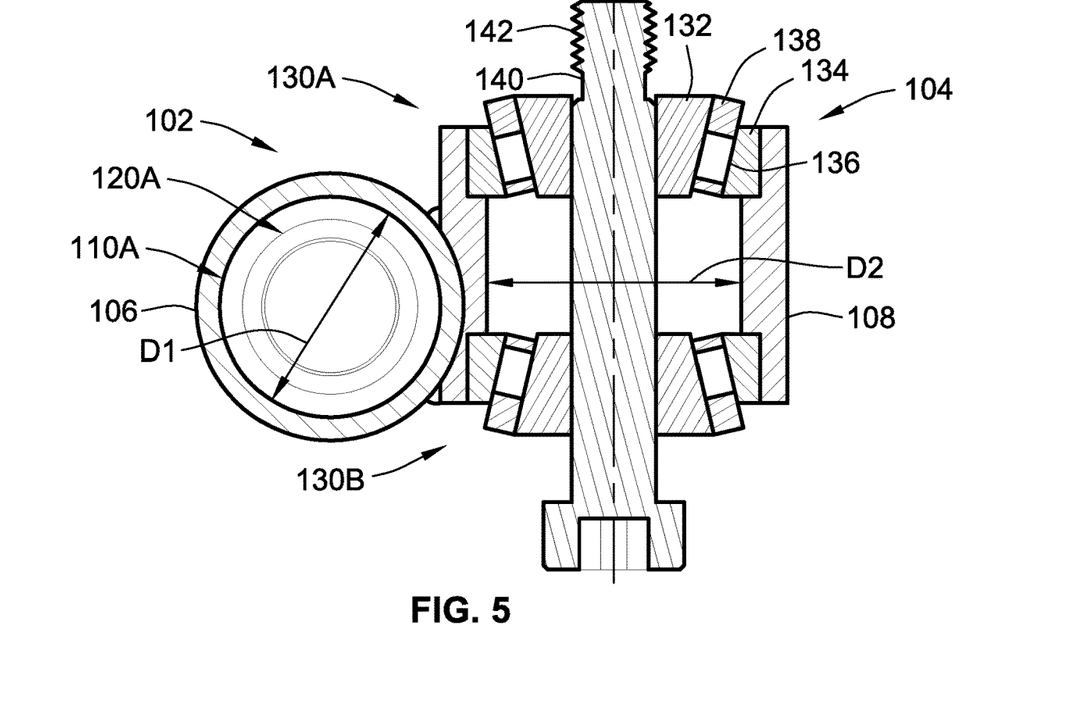
FIG. 5 is a cross-sectional, side-view illustration of the representative multi-axis pivoting coupler joint of FIG. 4 shown cutaway along line 5-5.
Figure 6:
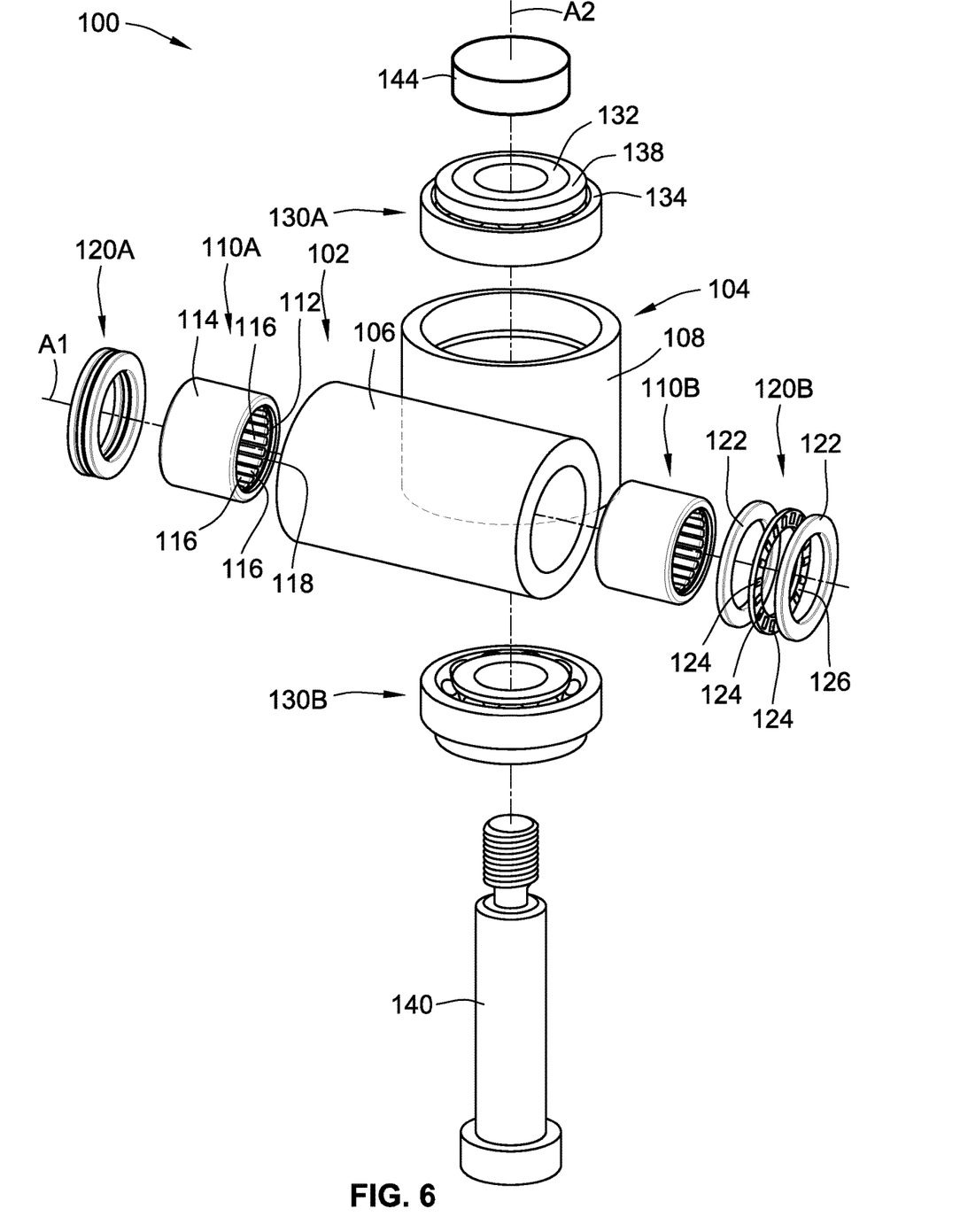
FIG. 6 is a partially exploded, perspective-view illustration of the representative multi-axis pivoting coupler joint of FIG. 4.

Turning next to FIGS. 4-6, there is shown a representative example of an articulating structural joint for pivotably mounting a wheeled rider platform to a chassis of a motor-assisted, human-powered vehicle. In accord with the example illustrated in FIG. 3, a multi-axis pivoting coupler joint 100 mechanically attaches the forward end of the rear scooter deck 38 to the first axle shaft 34A; the axle shaft 34A, in turn, is rotatably mounted to the underside of the support frame 36 by a series of laterally spaced pillow block bearings 68. Individual vehicle platforms and powertrain configurations may necessitate the pivoting coupler joint 100 be packaged in a manner that provides the scooter deck 38 with at least two-degrees of rotational freedom without obstructing operation of the vehicle's adaptive propulsion assist system 14. For the representative electric scooter 10 application of FIGS. 1-3, the pivoting coupler joint 100 inserts between two of the pillow block bearings 68, directly underneath the mounting plate 28, generally aligned along the longitudinal centerline of the vehicle chassis 12.

Pivoting coupler joint 100 of FIGS. 4-6 may be considered a bipartite apparatus composed of two multi-bearing devices: a first bearing assembly 102 with multiple discrete bearings that operatively attach to the axle shaft 34A; and a second bearing assembly 104 with multiple discrete bearings that operatively attach to the scooter deck 38. The first bearing assembly 102 is constructed with a rigid outer housing 106 (also referred to herein as "first bearing housing") that extends transversely with respect to the vehicle chassis 12. In contrast, the second bearing assembly 104 is constructed with a distinct rigid outer housing 108 (also referred to herein as "second bearing housing") that extends orthogonally with respect to the vehicle chassis 12 when the deck 38 is in a deployed position. While it is envisioned that pivoting coupler joint 100 may take on an assortment of shapes and sizes, both bearing housings 106, 108 are portrayed as elongated, right-circular cylinders with central through holes. Although similar in shape, the first bearing housing 106 has a (first) longitudinal length L1 and internal diameter D1 that are larger than the (second) longitudinal length L2 and internal diameter D2, respectively, of the second bearing housing 108. The two bearing housings 106, 108 may be rigidly joined together, e.g., via welding or fasteners, as a unitary assembly or may be integrally formed, e.g., via machining or casting, as a single-piece structure. Once properly joined, the tubular bearing housings 106, 108 are nonparallel, i.e., the first bearing housing 106 is angularly offset from the second bearing housing 108. As shown, the central axis of rotation A1 of the first bearing housing 106 is orthogonally oriented with respect to the central axis of rotation A2 of the second bearing housing 108.

With collective reference to FIGS. 4-6, the first bearing assembly 102 includes at least one or, in some applications, multiple rolling-element bearings that allow the pivoting coupler joint 100 to effectively clamp onto at least one axle shaft 34A without perceptibly impeding the transmission of rotational forces through that shaft 34A to its corresponding wheel unit 22A. By way of non-limiting example, the first bearing assembly 102 includes a right-hand (first) roller bearing 110A and a left-hand (second) roller bearing 110B, both of which are packaged inside the first bearing housing 106. The right-hand roller bearing 110A is positioned on the starboard side of the first bearing housing 106, whereas the left-hand roller bearing 110B is positioned at the opposite end of the housing 106 on the port side thereof. As will be described in further detail below, the two roller bearings 110A, 110B may each be a discrete needle-type roller bearing; however, it is envisioned that the roller bearings of the first and second bearing assemblies 102, 104 may take on any suitable rolling bearing configuration without departing from the intended scope of this disclosure.

Roller bearings 110A and 110B of the first bearing assembly 102 are both radial, needle-type roller bearings in which the rolling elements are elongated cylinders that are at least five to six times longer than their diameter. While not per se required, the first and second roller bearings 110A and 110B may be substantially identical; thus, for brevity and ease of reference, the structure and operation of both roller bearings 110A, 110B will be described below with reference to the right-hand roller bearing 110A. In accord with the illustrated example, each roller bearing 110A includes concentric inner and outer races, namely an annular inner race (ring) 112 that is coaxially aligned with and nested inside an annular outer race (shell) 114. Annular outer race 114 circumscribes the inner race 112 and is secured, e.g., via a key or splined engagement, at one end of the bearing housing 106. The outer race 114 of roller bearing 110A is shown as a rectangular toroid with an outer-diameter surface that sits substantially flush against the inner-diameter surface of the first bearing housing 106. Inner race 112, on the other hand, is sized to receive therethrough and circumscribe the axle shaft 34A.

Interposed between the inner and outer races 112, 114 of each roller bearing 110A is a respective set of load-bearing rolling elements 116 that allow for relative rotation between the pivoting coupler joint 100 and the axle shaft 34A. These rolling elements 116 are circumferentially spaced around the inner perimeter of the first outer race 114 and the outer perimeter of the inner race 112. Each rolling element 116 is rollably engaged with respective contact surface of both races 112, 114. The first set of rolling elements 116 may comprise approximately sixteen (16) elongated needle rollers that are sandwiched between the annular inner and outer races 112, 114 and generally parallel to the central axis of rotation A1 of the outer housing 106. An annular cage 118 is also interposed between the annular inner and outer races 112, 114 of the bearing assembly 102. This cage 118 includes a series of circumferentially spaced compartments (e.g., rectangular apertures), each of which seats therein a respective one of the elongated needle rollers 116.

In addition to the radial, needle-type roller bearings 110A, 110B packaged on the inside of the housing 106, the first bearing assembly 102 also includes a pair of thrust bearings 120A and 120B that are mounted on opposing, exterior end surfaces of the housing 106. For instance, the right-hand, thrust-type (third) roller bearing 120A is positioned on the starboard side of the first bearing housing 106, contiguous with and retaining in place the first roller bearing 110A. In the same vein, the left-hand, thrust-type (fourth) roller bearing 120B is positioned on the port side of the housing 106, contiguous with and retaining in place the second roller bearing 110B. Both thrust bearings 120A, 120B are portrayed in the Figures and described herein as needle-type bearing assemblies, which offer reduced packaging space requirements and increased load bearing capacity over their counterparts. However, it is envisioned that other thrust bearing configurations may be used, including ball-type and tapered-roller-type thrust bearing designs.

Thrust bearings 120A and 120B are both axial, needle-type roller bearings that help to minimize sliding friction (rubbing) between the first bearing housing 106 and the two pillow block bearings 68 neighboring to the left and right of the pivoting coupler joint 100. While not per se required, the two thrust bearings 120A, 120B may be substantially identical; thus, for brevity and ease of reference, the structure and operation of both thrust bearings 120A, 120B will be described below with reference to the left-hand thrust bearing 120B. In such as case, each thrust bearing 120B includes a pair of disc-shaped, toroidal thrust washers 122 with a set of needle rollers 124 interposed between facing planar surfaces of the thrust washers 122. Unlike a radial roller bearing, each needle roller 124 of a thrust bearing 120B is radially elongated with respect to and rollably abutting the toroidal thrust washers 122. A disc-shaped thrust cage 126 is sandwiched between the two toroidal thrust washers 122, seating therein and circumferentially spacing the needle rollers 124 from one another.

With continuing reference to FIGS. 3-6, the second bearing assembly 104 includes an upper (fifth) roller bearing 130A and a lower (sixth) roller bearing 130B, both of which are packaged at least partially inside the second bearing housing 108. When the scooter deck 38 is deployed, as seen in FIG. 1, the upper roller bearing 130A is positioned at the top end of the second bearing housing 108, whereas the lower roller bearing 130B is positioned at the opposite, bottom end of the housing 108. It may be desirable for at least some applications that these two roller bearings 130A, 130B each be a discrete taper-type roller bearing; however, as noted above, the roller bearings of the second bearing assembly 104 may take on other suitable rolling-element bearing configurations.

Roller bearings 130A and 130B of the second bearing assembly 104 are combined radial-and-axial tapered roller bearings in which the rolling elements are rigid frustocones with tapered contact surfaces that are obliquely angled with respect to the central axis of rotation A2 of the second bearing housing 108. Similar to the other roller bearing pairs described above, the tapered roller bearings 130A and 130B may be substantially identical; thus, for brevity and ease of reference, the structure and operation of both roller bearings 130A, 130B will be described below with reference to the upper roller bearing 130A. In accord with the illustrated example, each tapered roller bearing 130A includes concentric inner and outer races, namely a frustoconical inner race 132 that is coaxially aligned with and nested inside a ring-shaped outer race 134 with a frustoconical inner-diameter surface. Ring-shaped outer race 134 surrounds the frustoconical inner race 132 and is secured, e.g., via a key or splined engagement, at one end of the bearing housing 108. Frustoconical inner race 132 sits substantially flush against the frustoconical ID surface of the ring-shaped outer race 134 and is sized to receive therethrough and circumscribe a threaded mounting bolt 140.

Interposed between the inner and outer races 132, 134 of the tapered roller bearing 130A is a respective set of axial and radial load-bearing rolling elements 136 that allow for relative rotation between the pivoting coupler joint 100 and the wheeled scooter deck 38. These rolling elements 136 are circumferentially spaced around the inner perimeter of the ring-shaped outer race 134 and the inner perimeter of the frustoconical inner race 132. Each of these rolling elements 136 is rollably engaged with respective contact surface of both races 132, 134. This set of rolling elements 136 may comprise approximately twelve (12) tapered rollers that are sandwiched between the inner and outer races 132, 134 and obliquely angled with respect to the central axis of rotation A2 of the second outer housing 108. A frustoconical separator ring 138 is also interposed between the frustoconical inner race 132 and the ring-shaped outer race 134 of the bearing assembly 104. This separator ring 138 includes a series of circumferentially spaced pockets (e.g., rectangular through-holes), each of which seats therein a respective one of the tapered rollers 136.

Multi-axis pivoting coupler joint 100 of FIGS. 4-6 is rotatably coupled to the vehicle chassis 12 through the collaborative engagement between the first bearing assembly 102 and the first axle shaft 34A. The foregoing engagement allows the scooter deck 38 to independently rotate about the first axis of rotation A1. The pivoting coupler joint 100 is also rotatably coupled to the wheeled scooter deck 38 through the collaborative engagement between the second bearing assembly 104 and the mounting bolt 140. As seen in FIG. 5, the mounting bolt 140 has a threaded outer-diameter (OD) surface 142 that threadably engages with a threaded inner-diameter (ID) surface of a mounting cap 144. By passing the threaded end of the mounting bolt 140 through a complementary bolt hole in the scooter deck 38, through the interior of the second bearing assembly 104, namely the first and second tapered roller bearings 130A, 130B, and torqueing the mounting cap 144 onto the threaded OD surface 142 will movably attach the scooter deck 36 to the pivoting coupler joint 100. The foregoing engagement allows the scooter deck 38 to independently rotate about the second axis of rotation A2.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A pivoting coupler joint for a vehicle, the vehicle including a chassis, first and second wheels rotatably attached via an axle shaft to the chassis, and a wheeled rider deck configured to support thereon a user, the pivoting coupler joint comprising:
   a first bearing assembly including a first bearing housing, first inner and outer races concentric with each other and located in the first bearing housing, and a first plurality of rolling elements rollably interposed between the first inner and outer races, the first inner race being configured to receive therethrough and circumscribe the axle shaft; and
   a second bearing assembly including a second bearing housing, second inner and outer races concentric with each other and located in the second bearing housing, and a second plurality of rolling elements rollably interposed between the second inner and outer races, the second bearing housing being joined to and angularly offset from the first bearing housing, and the second inner race being configured to attach to the wheeled rider deck.

2. The pivoting coupler joint of claim 1, wherein the second inner race of the second bearing assembly includes first and second frustoconical inner races positioned at opposing first and second ends, respectively, of the second bearing housing.

3. The pivoting coupler joint of claim 2, wherein the second outer race includes first and second ring-shaped outer races with frustoconical inner surfaces, the first ring-shaped outer race being secured at the first end of the second bearing housing and circumscribing the first frustoconical inner race, and the second ring-shaped outer race being secured at the second end of the second bearing housing and circumscribing the second frustoconical inner race.

4. The pivoting coupler joint of claim 3, wherein the second plurality of rolling elements includes a first set of tapered rollers sandwiched between the first frustoconical inner race and the first ring-shaped outer race, and a second set of tapered rollers sandwiched between the second frustoconical inner race and the second ring-shaped outer race.

5. The pivoting coupler joint of claim 4, further comprising:
   a first frustoconical separator ring interposed between the first frustoconical inner race and the first ring-shaped outer race and including a first series of circumferentially spaced pockets each seating therein a respective one of the first set of tapered rollers; and
   a second frustoconical separator ring interposed between the second frustoconical inner race and the second ring-shaped outer race and including a second series of circumferentially spaced pockets each seating therein a respective one of the second set of tapered rollers.

6. The pivoting coupler joint of claim 1, further comprising a mounting bolt with a threaded outer-diameter (OD) surface, the mounting bolt passing through a bolt hole in the wheeled rider deck and through the second bearing assembly to threadably mate with a threaded inner-diameter (ID) surface of a complementary cap to thereby movably attach the wheeled rider deck to the second bearing assembly.

7. The pivoting coupler joint of claim 1, wherein the first inner race of the first bearing assembly includes first and second annular inner races positioned at opposing first and second ends, respectively, of the first bearing housing.

8. The pivoting coupler joint of claim 7, wherein the first outer race includes first and second annular outer races, the first annular outer race being secured at the first end of the bearing housing and circumscribing the first annular inner race, and the second annular outer race being secured at the second end of the first bearing housing and circumscribing the second annular inner race.

9. The pivoting coupler joint of claim 8, wherein the first plurality of rolling elements includes a first set of elongated needle rollers sandwiched between the first annular inner and outer races, and a second set of elongated needle rollers sandwiched between the second annular inner and outer races.

10. The pivoting coupler joint of claim 9, further comprising:
    a first annular cage interposed between the first annular inner and outer races and including a first series of circumferentially spaced compartments each seating therein a respective one of the first set of elongated needle rollers; and
    a second annular cage interposed between the second annular inner and outer races and including a second series of circumferentially spaced compartments each seating therein a respective one of the second set of elongated needle rollers.

11. The pivoting coupler joint of claim 1, further comprising first and second thrust bearings mounted on opposing first and second end surfaces, respectively, of the first bearing housing.

12. The pivoting coupler joint of claim 1, wherein the first bearing housing is a first elongated cylinder, and the second bearing housing is a second elongated cylinder orthogonally oriented with respect to the first elongated cylinder.

13. The pivoting coupler joint of claim 1, wherein the first and second bearing housings are welded together at a weld joint or are integrally formed together as a single-piece structure.

14. An electric scooter comprising:
    a vehicle chassis;
    a handlebar attached to the vehicle chassis;
    first and second ground wheels rotatably attached via first and second axle shafts to opposing lateral sides of the vehicle chassis;
    a traction motor mounted to the vehicle chassis and configured to selectively impart assist torque to drive one or more of the ground wheels;
    a wheeled scooter deck configured to support thereon a standing user; and
    a pivoting coupler joint movably mounting the wheeled scooter deck to the vehicle chassis to pitch and yaw with respect to the vehicle chassis, the pivoting coupler joint including:
       a first bearing assembly with a first bearing housing, concentric first inner and outer races located in the first bearing housing, and a first plurality of rolling elements rollably interposed between the first inner and outer races, the first inner race receiving therethrough and circumscribing the first axle shaft; and
       a second bearing assembly with a second bearing housing, concentric second inner and outer races located in the second bearing housing, and a second plurality of rolling elements rollably interposed between the second inner and outer races, the second bearing housing joined to and orthogonal with the first bearing housing, and the second inner race attached to the wheeled scooter deck.

15. A method of manufacturing a pivoting coupler joint for a vehicle, the vehicle including a chassis, first and second wheels rotatably attached via an axle shaft to the chassis, and a wheeled rider deck configured to support thereon a user, the method comprising:
- assembling a first bearing assembly with a first bearing housing, first inner and outer races concentric with each other and located in the first bearing housing, and a first plurality of rolling elements rollably interposed between the first inner and outer races, the first inner race being configured to receive therethrough and circumscribe the axle shaft;
- assembling a second bearing assembly with a second bearing housing, second inner and outer races concentric with each other and located in the second bearing housing, and a second plurality of rolling elements rollably interposed between the second inner and outer races, the second inner race being configured to attach to the wheeled rider deck; and
- joining the first bearing housing to the second bearing housing such that the first and second bearing housings are angularly offset with each other.

16. The method of claim 15, wherein the second inner race includes first and second frustoconical inner races positioned at opposing first and second ends, respectively, of the second bearing housing, and the second outer race includes first and second ring-shaped outer races with frustoconical inner surfaces, the first ring-shaped outer race being secured at the first end of the second bearing housing and circumscribing the first frustoconical inner race, and the second ring-shaped outer race being secured at the second end of the second bearing housing and circumscribing the second frustoconical inner race.

17. The method of claim 16, wherein the second plurality of rolling elements includes a first set of tapered rollers sandwiched between the first frustoconical inner race and first ring-shaped outer race, and a second set of tapered rollers sandwiched between the second frustoconical inner race and second ring-shaped outer race.

18. The method of claim 15, wherein the first inner race includes first and second annular inner races positioned at opposing first and second ends, respectively, of the first bearing housing, and the first outer race includes first and second annular outer races, the first annular outer race being secured at the first end of the bearing housing and circumscribing the first annular inner race, and the second annular outer race being secured at the second end of the first bearing housing and circumscribing the second annular inner race.

19. The method of claim 18, wherein the first plurality of rolling elements includes a first set of elongated needle rollers sandwiched between the first annular inner and outer races, and a second set of elongated needle rollers sandwiched between the second annular inner and outer races.

20. The method of claim 15, wherein joining the first and second bearing housings includes welding the first bearing housing to the second bearing housing.

* * * * *